US012558615B2

(12) United States Patent    (10) Patent No.:   US 12,558,615 B2

Lv    (45) Date of Patent:   Feb. 24, 2026

(54) GAMEPAD CAPABLE OF AUTOMATICALLY SWITCHING KEY LAYOUTS

(71) Applicant: Shenzhen Yiqianmi Technology Co., Ltd., Shenzhen (CN)

(72) Inventor: Kunjiang Lv, Shenzhen (CN)

(73) Assignee: SHENZHEN YIQIANMI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/965,058

(22) Filed: Dec. 2, 2024

(65) Prior Publication Data

US 2025/0090944 A1    Mar. 20, 2025

(30) Foreign Application Priority Data

Aug. 19, 2024   (CN) .......................... 202411138770.2

(51) Int. Cl.
   *A63F 13/22*      (2014.01)
   *A63F 13/2145*    (2014.01)
   *A63F 13/24*      (2014.01)

(52) U.S. Cl.
   CPC .............. *A63F 13/22* (2014.09); *A63F 13/24* (2014.09); *A63F 13/2145* (2014.09)

(58) Field of Classification Search
   CPC ................................. A63F 13/22; A63F 13/24
   See application file for complete search history.

(56) References Cited

U.S. PATENT DOCUMENTS

| | | | |
|---|---|---|---|
| 2014/0024456 A1* | 1/2014 | Ashley | .................... A63F 13/24 |
| | | | 463/37 |
| 2017/0043245 A1* | 2/2017 | Ho | ......................... A63F 13/218 |
| 2023/0415032 A1* | 12/2023 | Yu | ......................... H01H 13/705 |

* cited by examiner

*Primary Examiner* — Yingchuan Zhang

(57) ABSTRACT

A gamepad capable of automatically switching key layouts includes a key assembly, a face shell, a display screen assembly, a main control board, and a plurality of trigger switches. The key assembly includes a plurality of transparent keys. The face shell includes a front surface and a back surface, a plurality of mounting holes which penetrate through the front surface and the back surface are formed in the face shell corresponding to the key assembly. The display screen assembly includes a display screen facing the back surface. The main control board controls the display screen to switch the plurality of first icons to a plurality of second icons, so as to obtain a second key layout, the second key layout is different from the first key layout. The main control board controls the corresponding trigger switch to output a control signal corresponding to the current key layout.

9 Claims, 4 Drawing Sheets

1

GAMEPAD CAPABLE OF AUTOMATICALLY SWITCHING KEY LAYOUTS

CROSS-REFERENCE TO RELATED APPLICATIONS

This application claims priority to Chinese Patent Application No. 202411138770.2, filed on Aug. 19, 2024, the content of which is incorporated herein by reference in its entirety.

TECHNICAL FIELD

The present application relates to the technical field of game controllers, in particular to a gamepad capable of automatically switching key layouts.

BACKGROUND

A wide range of game types and player habits in terms of key layout often needs to be considered for a gamepad, which serves as a game controller. Keys of the existing gamepad are printed with icons on their tops. The keys of the gamepad need to be changed in response to adapting to different game consoles, which is more difficult and very inconvenient for users. In practical applications, one gamepad is generally only suitable for one model of game consoles, resulting in poor adaptability of the gamepad.

SUMMARY

In view of this, it is necessary to propose a gamepad capable of automatically switching key layouts, which can adapt to different models of game consoles.

An embodiment of the present application provides a gamepad capable of automatically switching key layouts. The gamepad includes a key assembly, a face shell, a display screen assembly, a main control board, and a plurality of trigger switches. The key assembly includes a plurality of transparent keys, which are arranged according to a preset position relationship. The face shell includes a front surface and a back surface; a plurality of mounting holes which penetrate through the front surface and the back surface are formed in a position of the face shell corresponding to the key assembly; and the mounting holes are exposed to the front surface for the keys to pass through. The display screen assembly includes a display screen facing the back surface. A plurality of corresponding first icons are displayed at positions of the display screen corresponding to the transparent keys to obtain the main control board of a first key layout; the main control board is configured to control the display screen to switch the plurality of first icons to a plurality of second icons in response to a user switching operation, so as to obtain a second key layout; and the second key layout is different from the first key layout. The plurality of trigger switches are in one-to-one correspondence to the plurality of transparent keys; and when one or more of the transparent keys are operated, the main control board controls the corresponding trigger switch to output a control signal corresponding to the current key layout.

Further, all of the first icons are not identical, partially identical, or completely identical to all of the second icons.

Further, if all of the first icons are completely identical to all of the second icons, the plurality of first icons and the plurality of second icons are distributed in partially or completely different positions.

2

Further, the icons corresponding to the plurality of transparent keys are different from those corresponding to at least one transparent key under the second key layout and the first key layout.

Further, each of the plurality of transparent keys includes a transparent keycap and a support foot; the keycap is exposed to the front surface through the mounting hole; the support foot is located on one side of the back surface; the keycap is arranged oppositely to the display screen; and the support foot is located outside the display screen.

Further, the main control board is located on one side of the display screen away from the keycap; the plurality of trigger switches are arranged on the main control board; each of the plurality of trigger switches corresponds to the support foot of each of the plurality of transparent keys; and when one or more of the keys are operated, the corresponding support foot triggers the corresponding trigger switch, so as to produce a response control signal.

Further, the display screen assembly further includes a bracket; the bracket is installed on the main control board; and the display screen is arranged on the bracket.

Further, the bracket is provided with guide portions; the guide portion corresponds to the support foot of each of the plurality of transparent keys; and the support foot passes through the guide portion and is arranged oppositely to the corresponding trigger switch on the main control board.

Further, the bracket includes a support portion and a support leg; the support leg is fixed to the main control board; and the support portion is used to carry the display screen and supported on the main control board through the support leg.

Further, the gamepad further includes shortcut keys through which the user implements a switching operation.

One display screen assembly is additionally provided for the gamepad capable of automatically switching the key layouts. Specifically, by providing the display screen on the gamepad and modifying a mapping relationship through the shortcut keys, corresponding key patterns are mapped to the corresponding transparent keys, such that key types on the transparent keys can be switched. Therefore, the gamepad can automatically switch the key layouts according to different game types or player needs, such that the operational flexibility is improved, the player's adaptation time when switching games is shortened, and the players can immerse themselves in the game more quickly, thereby improving the convenience of the gaming experience.

BRIEF DESCRIPTION OF THE DRAWINGS

To describe the embodiments of the present application or the technical solutions in the prior art more clearly, the following briefly introduces the accompanying drawings required for describing the embodiments or the descriptions in the prior art. Apparently, the accompanying drawings in the following description show merely some embodiments of the present application, and a person of ordinary skill in the art may still derive other drawings from these accompanying drawings without creative efforts.

The achievement of the object, functional characteristics and advantages of the present application will be further described in conjunction with the embodiments and with reference to the accompanying drawings.

DETAILED DESCRIPTION OF THE EMBODIMENTS

To make the objectives, technical solutions, and advantages of the present application clearer, the following further describes the present application in detail in combination with the accompanying drawings and the embodiments. It should be understood that the specific embodiments described herein are only used for explaining the present application, and are not used for limiting the present application. Based on the embodiments in the present application, all other embodiments derived by a person of ordinary skill in the art without creative efforts shall fall within the protection scope of the present application.

The terms "first", "second", "third", "fourth" and the like in the description and claims, as well as the above-mentioned drawings, of the present application are configured to distinguish similar objects, but not necessarily used to describe a specific order or precedence order. It should be understood that data used in this way may be interchanged where appropriate. In other words, the embodiments described herein can be implemented in a sequence other than those illustrated or described herein. Furthermore, the terms "including" and "having" and any variants thereof are intended to cover other inclusions. For example, a process, method, system, product, or device that includes a series of steps or units is not necessarily limited to those steps or units that are clearly listed, but may include other steps or units that are not clearly listed or are inherent to such processes, methods, products, or devices.

It should be noted that the terms "first", "second", and the like involved in the present application are only for the purpose of description and should not be construed as indicating or implying relative importance or implicitly indicating the number of technical features indicated. Thus, the features defined by the terms "first" and "second" may include one or more of the features either explicitly or implicitly. Furthermore, the technical solutions of various embodiments may be combined with one another on the basis that the combination thereof can be realized by a person of ordinary skill in the art. When the combination of technical solutions conflicts or cannot be achieved, it should be considered that such a combination of technical solutions does not exist and does not fall within the protection scope claimed by the present application.

Figure 1:
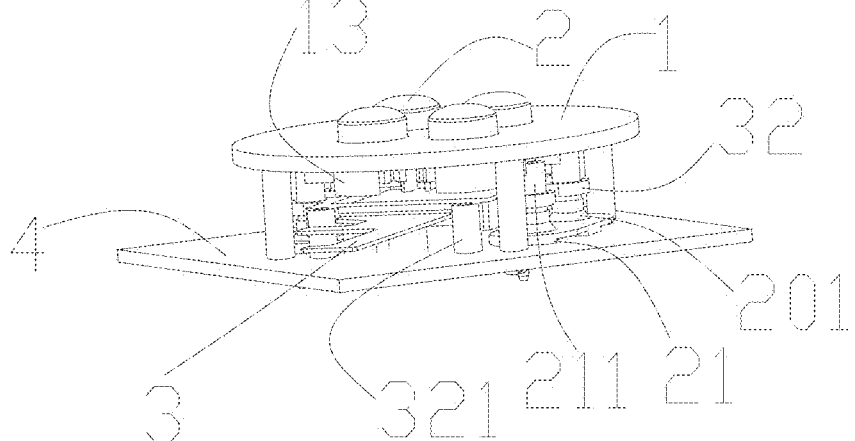
FIG. 1 is a local schematic diagram of a gamepad provided by an embodiment of the present application.
Figure 2:
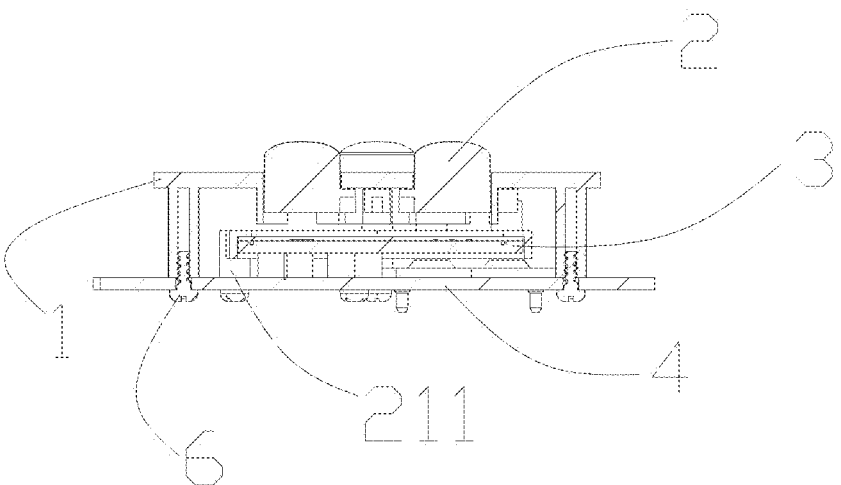
FIG. 2 is a local sectional view of the gamepad shown in FIG. 1.
Figure 3:
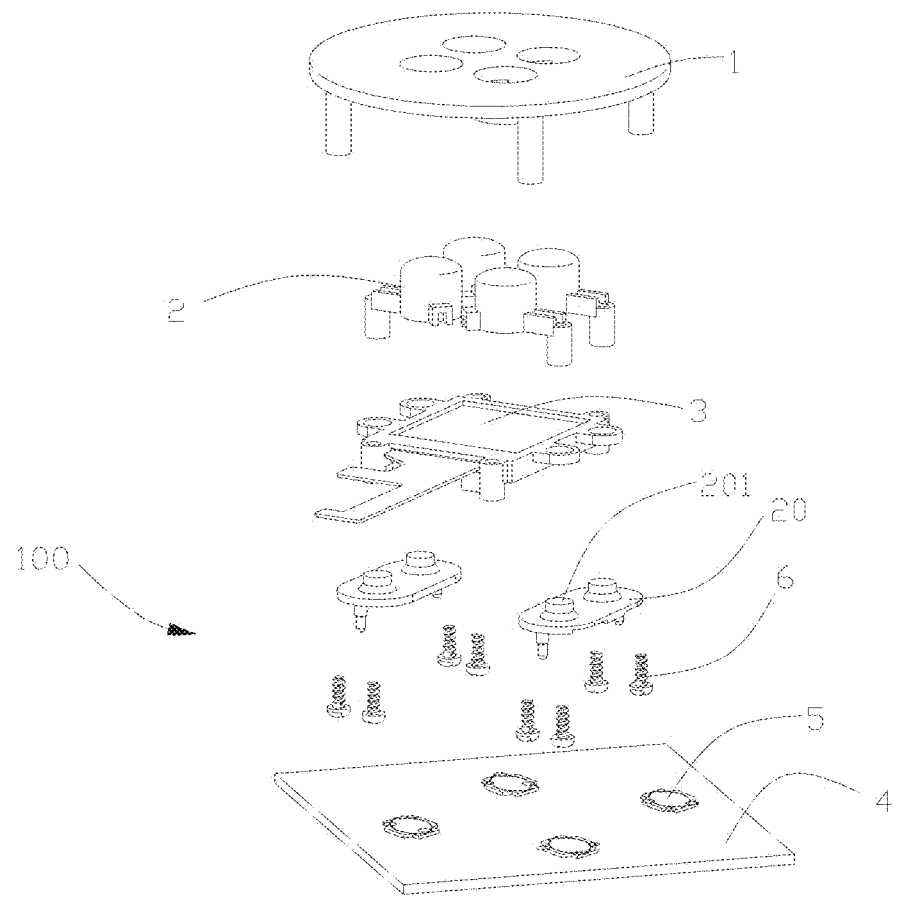
FIG. 3 is a local exploded view of the gamepad shown in FIG. 1.

Referring to FIGS. 1 and 3, FIG. 1 is a schematic structural diagram of a gamepad capable of automatically switching key layouts provided by an embodiment of the present application; and FIG. 3 is a local exploded view of the gamepad shown in FIG. 1. The gamepad 100 includes: a face shell 1, a key assembly 2, a display screen assembly 3, a main control board 4 and a plurality of trigger switches 5. The face shell 1 is a part of a gamepad shell in which internal assemblies of the gamepad 100 are wrapped and installed. In this embodiment, only a part of the gamepad shell corresponding to the key assembly 2 is schematically illustrated. The internal assemblies include, but are not limited to: the key assembly 2, the display screen assembly 3, the main control board 4, the plurality of trigger switches 5, etc.

Figure 4:
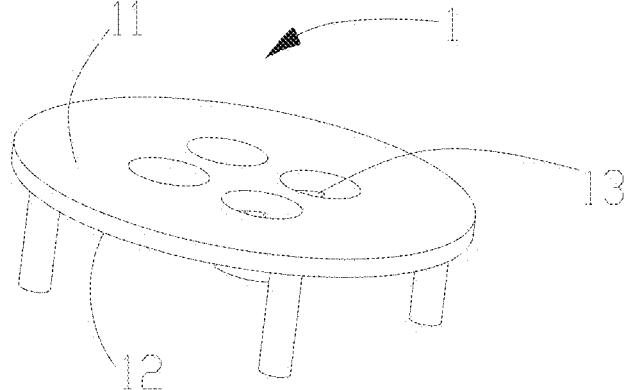
FIG. 4 is a schematic diagram of a face shell provided by an embodiment of the present application.

Referring to FIG. 4, the face shell 1 may be made of plastic, metal, or a composite material. The face shell 1 has a front surface 11 and a back surface 12. The face shell 1 is provided with a plurality of mounting holes 13 penetrating through the front surface 11 and the back surface 12. In this embodiment, the number of the mounting holes 13 is 4, and the four mounting holes are all round and arranged in a cross shape, or located at four corners of a rectangle.

Figure 5:
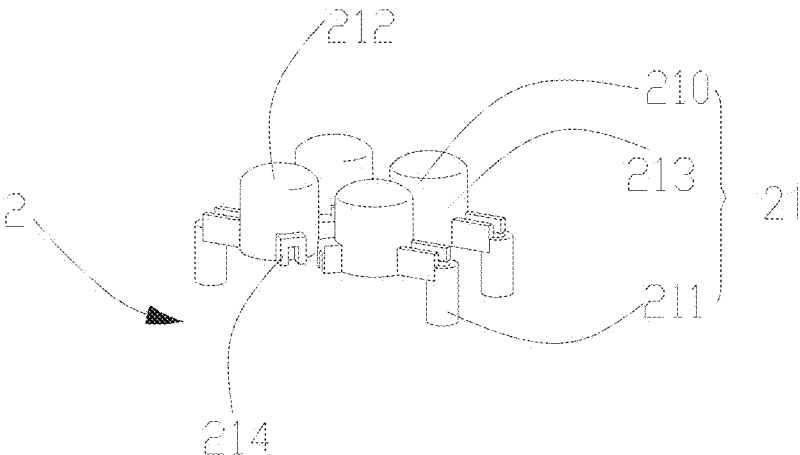
FIG. 5 is a schematic diagram of a key assembly provided by an embodiment of the present application.

Referring to FIGS. 3 to 5, in this embodiment, the key assembly 2 is navigation keys of the gamepad 100, and the navigation keys are a plurality of keys that are distributed according to preset positions. Specifically, the key assembly 2 includes a plurality of transparent keys 21 and key silica gel 20, and the plurality of transparent keys 21 are arranged according to a preset position relationship. In this embodiment, the transparent keys 21 are in one-to-one correspondence to the plurality of mounting holes 13. That is, the transparent keys 21 are arranged in a cross shape or located at four corners of the rectangle. The number of the transparent keys 21 is the same as the number of the mounting holes 13, and the shape of each transparent key 21 is adapted to the corresponding mounting hole 13. It may be understood that the number, shape and distribution positions of the mounting holes 13 are arranged with the design of the transparent keys 21.

In this embodiment, each transparent key 21 is made of a transparent material as a whole. Each transparent key 21 includes a transparent keycap 210 and a support foot 211 extending from the bottom of the keycap 210. The keycap 210 is exposed to the front surface 11 of the face shell 1 from the mounting hole 13, and the support foot 211 is located on one side of the back surface 12 of the face shell 1. More specifically, the keycap 21 is cylindrical as a whole, and a top 212 of the keycap 21 is curved. The support foot 211 is L-shaped. The support foot 211 is connected to a position of a sidewall 213 of the keycap 210 away from the top 212. The support foot 211 first extends horizontally from the sidewall 213 of the keycap 210, and then extends vertically in a direction away from the keycap 210. Each transparent key 21 is further provided with a plurality of limiting members 214. In this embodiment, three limiting members 214 are provided, which are approximately block-shaped and used to limit a movement stroke of the keycap 211. The three limiting members 214 and the support feet 211 are arranged at equal intervals on the sidewall 213; and positions of the limiting members 214 and the support feet 211, which are connected to the sidewall 213, are located in the same plane. That is, the support foot 211 also has a function of limiting a stroke of the keycap 211.

The key silica gel 20 is arranged below the plurality of transparent keys 21. The key silica gel 20 is made of a silica gel material and is provided with protrusions 201. The protrusion 201 corresponds to each transparent key 21 and is used in conjunction with the transparent key 21 to improve the haptic experience of the key assembly 2.

Figure 6:
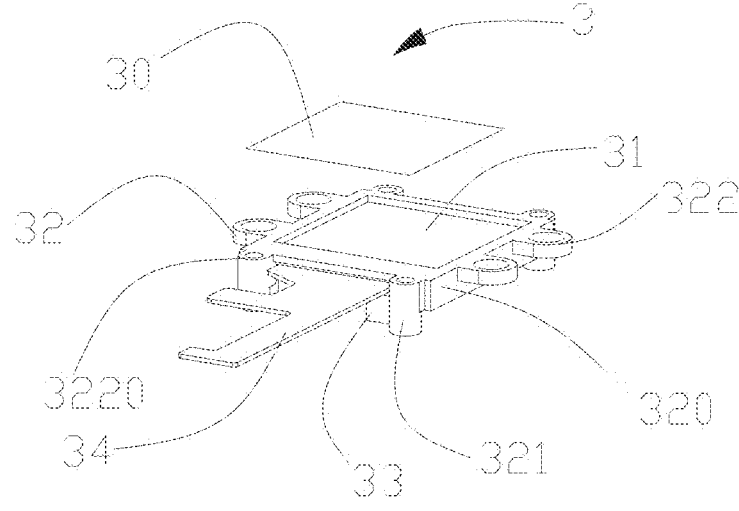
FIG. 6 is a schematic diagram of a display screen assembly provided by an embodiment of the present application.
Figure 7:
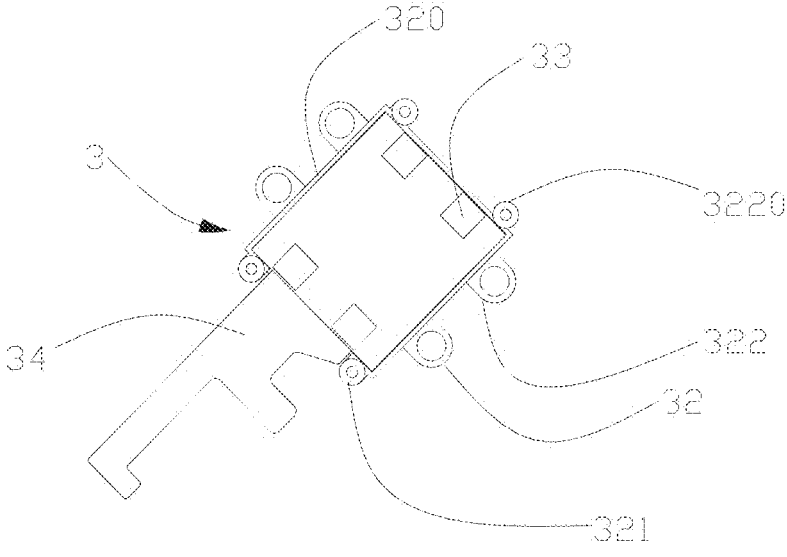
FIG. 7 is a schematic diagram of a back surface of a display screen assembly provided by an embodiment of the present application.

Referring to FIG. 6 and FIG. 7, the display screen assembly 3 includes a dustproof sheet 30, a display screen 31, a bracket 32, a cushion pad 33 and a flexible flat cable 34. The dustproof sheet 30 is tightly attached to one side of the display screen 31 facing the keycap 210, and is used to protect the display screen 31 from dust. The display screen 31 and the cushion pad 33 are arranged on the bracket 32 away from each other. In this embodiment, the cushion pad 33 is a foam pad for further protecting the display screen 31, such that the display screen 31 can be buffered and protected from being broken under impact. The flexible flat cable 34 is connected to the display screen 31 and extends out of the bracket 32.

The bracket 32 includes a support portion 320, and a support leg 321 that is connected to the support portion 320 and protrudes from one side of the support portion 320. The support portion 320 is approximately rectangular. One side of the support portion 320 is provided with a recess 3201. The support leg 321 is approximately in a hollow and cylindrical shape. In this embodiment, a sidewall of the support leg 321 is connected to the support portion 320, one end of the support leg 321 is flush with one side of the support portion 320 where the recess 3201 is provided, and the other end of the support leg 321 protrudes from one side of the support portion 320 away from the recess 3201. Further, the bracket 32 is further provided with a plurality of guide portions 322. The plurality of guide portions 322 are in one-to-one correspondence with the support feet 211, that is, the number of guide portions 322 is also 4. Each guide portion 322 is provided with a through hole 3220 through which the support foot 211 penetrates from one side to the other side of the support portion 320. The cushion pad 33 is made of foam or other cushioning material. The cushion pad 33 is arranged on the other side of the support portion 320 away from the recess 3201.

The display screen 31 is fixed in the recess 3201. The display screen 31 faces the back surface 12 and the keycap 21 and is surrounded by the support feet 211. That is, the support feet 211 are located outside the display screen 31, so that the display screen 31 is covered by the key assembly 2 as a whole. The corresponding icon is displayed on a position of the display screen 31 corresponding to each transparent key 21. Because each transparent key 21 is made of a transparent material, each transparent key 21 visually carries the corresponding icon. That is, the key assembly 2 and the display screen assembly 3 make each transparent key 21 and the key with its own icon visually consistent. The display screen 31 may be a touch or non-touch display screen. In this embodiment, the gamepad 100 pre-stores a plurality of key layout-related data, and the display screen 31 displays the first key layout of the plurality of first icons by default. For example, the first icons are sequentially displayed in a clockwise direction as ABYX. The user may operate the gamepad 100 and switch the key layouts, so that the display screen 31 switches to the second key layout (i.e., other key layout) that displays a plurality of second icons. For example, the second icons are sequentially displayed in a clockwise direction as BAXY, or ABHY, etc. Specifically, the gamepad 100 is provided with shortcut keys 101, and the shortcut keys 101 are one or more combinations of the plurality of transparent keys, or other keys. The user triggers a key layout switching function by pressing a specific key combination (e.g., "B"+"A") on the gamepad 100. When the display screen 31 is a touch screen, the shortcut keys 101 may also be soft keys displayed on the touch screen, and the user realizes a switching operation through the shortcut keys. In this embodiment, all of the first icons are not identical, partially identical, or completely identical to all of the second icons. It may be understood that the icons displayed under the first and second key layouts are identical, but are different in order; and the icons displayed under the first and second key layouts are completely identical or partially different. Further, if all of the first icons are completely identical to all of the second icons, the plurality of first icons and the plurality of second icons are distributed at partially or completely different positions. Further, the icons corresponding to the plurality of transparent keys 21 are different from those corresponding to at least one transparent key 21 under the second key layout and the first key layout. In this embodiment, the plurality of first and second icons are alphabets. In other embodiments, the first and second icons may also be other characters, such as Chinese characters or illustrated diagrams (e.g., arrows and boxes), and the like.

In this embodiment, the gamepad 100 outputs corresponding control signals of a game console under the current key layout by the user operating the transparent keys 21, or executes a key layout switching function by the user operating the shortcut keys 101, both of which are achieved under the control of the main control board 4.

The main control board 4 is located on one side of the display screen 31 away from the keycap 210, and is plugged with the flexible flat cable 34, thereby communicating with the display screen 31. A plurality of trigger switches 5 are arranged on one side of the main control board 4 facing the display screen 31. The main control board 4 is fixed with the support leg 321 through a fixing member 6, so that the bracket 32 on which the display screen 31 is installed is supported on the main control board 4. The key silica gel 20 is inserted into the main control board 4 and located above the trigger switch 5, and is opposite to the support feet 211. That is, each of the plurality of trigger switches 5 corresponds to the support foot 20 of each of the plurality of transparent keys 21 through the key silica gel 20. When the user presses one or more transparent keys 21, the key silica gel 20 will touch the trigger switch 5 because of the extrusion of the support foot 211, so that the trigger switch 5 is triggered, and then the main control board 4 produces a corresponding trigger signal.

A micro switch is used as the trigger switch 5, and the main control board 4 can accurately detect a pressing action of each of the plurality of transparent keys 21. In this embodiment, the trigger switch 5 is a metal dome switch. In some feasible embodiments, the trigger switch 5 may also be provided as a contact point which is made of a sensitive element such as a conductive film.

Under the current key layout, when one or more transparent keys 21 are pressed, the main control board 4 outputs the corresponding control signal to control the control signal of the game console. When the user operates the shortcut keys, the main control board 4 switches to the corresponding key layout sequentially according to a preset switching sequence.

Obviously, a person skilled in the art may make various alterations and variations to the present application without departing from the spirit and scope of the present application. Thus, if these modifications and variants of the present application fall within the scope of the claims of the present application and its equivalents, the present application is also intended to include such alterations and variants.

The above content is only preferred embodiments of the present application, and of course, may not be used to limit the scope of the rights of the present application. Therefore, the equivalent changes made according to the claims of the present application are still within the scope of the present application.

What is claimed is:

1. A gamepad capable of automatically switching key layouts, comprising:

a key assembly, comprising a plurality of transparent keys, wherein the plurality of transparent keys are arranged according to a preset position relationship;

a face shell, comprising a front surface and a back surface, wherein the front surface is a surface that is exposed to an outside of the gamepad; the back surface is a surface that faces to an interior of the gamepad; a plurality of mounting holes which penetrate through the front surface and the back surface are formed in a position of the face shell corresponding to the key assembly; the mounting holes are exposed to the front surface for the keys to pass through;

a display screen assembly, comprising a display screen facing the back surface and disposed at a side of the back surface away from the front surface of the face shell, wherein a plurality of corresponding first icons are displayed at positions of the display screen corresponding to the transparent keys to obtain a first key layout;

a main control board, configured to control the display screen to switch the plurality of first icons to a plurality of second icons in response to a user switching operation, so as to obtain a second key layout, wherein the second key layout is different from the first key layout; and a plurality of trigger switches or contact points, which are in one-to-one correspondence to the plurality of transparent keys, wherein when one or more of the transparent keys are operated, the corresponding trigger switch is triggered, such that the main control board outputs a control signal corresponding to the current key layout;

wherein the display screen assembly is fixedly supported on the main control board; and each of the plurality of transparent keys is movable with respect to the main control board;

the display screen assembly further comprises a bracket fixedly supported on the main control board; the display screen is arranged on the bracket; the bracket comprises a plurality of guide protrusions, the plurality of guide protrusion define a plurality of through holes;

the plurality of transparent keys comprise a plurality of transparent keycaps and a plurality of support feet; each of the plurality of support feet extends through a respective one of the plurality of through holes; and the plurality of support feet surround a periphery of the display screen.

2. The gamepad capable of automatically switching key layouts according to claim 1, wherein all of the first icons are not identical, partially identical, or completely identical to all of the second icons.

3. The gamepad capable of automatically switching key layouts according to claim 2, wherein if all of the first icons are completely identical to all of the second icons, the plurality of first icons and the plurality of second icons are distributed at partially or completely different positions.

4. The gamepad capable of automatically switching key layouts according to claim 1, wherein the plurality of first icons corresponding to the plurality of transparent keys in the first key layout and the plurality of second icons corresponding to the plurality of transparent keys in the second key layout have at least one difference.

5. The gamepad capable of automatically switching key layouts according to claim 1, wherein the keycap is exposed to the front surface through the mounting hole; the support foot is located on one side of the back surface; the keycap is arranged oppositely to the display screen; and the support foot is located outside the display screen.

6. The gamepad capable of automatically switching key layouts according to claim 1, wherein the main control board is located on one side of the display screen away from the keycap; the plurality of trigger switches are arranged on the main control board; each of the plurality of trigger switches corresponds to the support foot of each of the plurality of transparent keys or contact points; the key assembly further comprises key silica gel which is arranged between the support foot and the trigger switch or the contact point; and when one or more of the keys are operated, the corresponding support foot triggers the corresponding trigger switch or contact point corresponding to the key silica gel, so as to produce a response control signal.

7. The gamepad capable of automatically switching key layouts according to claim 1, wherein the display screen assembly further comprises a bracket; the bracket is installed on the main control board; and the display screen is arranged on the bracket.

8. The gamepad capable of automatically switching key layouts according to claim 7, wherein the bracket comprises a support portion and a support leg; the support leg is fixed to the main control board; and the support portion is used to carry the display screen and is supported on the main control board through the support leg.

9. The gamepad capable of automatically switching key layouts according to claim 1, further comprising shortcut keys through which the user implements a switching operation.

* * * * *